United States Patent [19]
Sumiya et al.

[11] Patent Number: 5,564,979
[45] Date of Patent: Oct. 15, 1996

[54] AIR PASSAGE SWITCHING DEVICE AND VEHICULAR AIR CONDITIONER

[75] Inventors: Yasuhiko Sumiya; Kazuma Inagaki, both of Hekinan; Takayasu Kojima, Anjo; Hiroyuki Yamaguchi, Aichi-gun, all of Japan

[73] Assignee: Nippondenso Co., Ltd., Kariya, Japan

[21] Appl. No.: 439,179

[22] Filed: May 11, 1995

[30] Foreign Application Priority Data

May 11, 1994 [JP] Japan ................................ 6-097300
Dec. 2, 1994 [JP] Japan ................................ 6-299421

[51] Int. Cl.⁶ .................................................... B60H 1/26
[52] U.S. Cl. ............................................ 454/121; 454/126
[58] Field of Search ................................ 454/121, 126, 454/139, 159, 160, 161

[56] References Cited

U.S. PATENT DOCUMENTS

| 5,062,352 | 11/1991 | Ostrand | 454/121 |
| 5,105,730 | 4/1992 | Smith | 454/161 |
| 5,326,315 | 7/1994 | Inoue et al. | 454/126 |
| 5,350,335 | 9/1994 | Anderson | 454/121 |

FOREIGN PATENT DOCUMENTS

| 2704522 | 8/1978 | Germany . | |
| 3119557 | 3/1982 | Germany . | |
| 4103035 | 8/1992 | Germany . | |
| 50-65151 | 6/1975 | Japan . | |
| 186415 | 7/1989 | Japan | 454/121 |

*Primary Examiner*—Harold Joyce
*Attorney, Agent, or Firm*—Cushman, Darby & Cushman

[57] ABSTRACT

An air duct has air passages for the air to flow from the inside to the outside. An air passage switching device includes a rotary door and a film member for opening/closing and switching the air passages. The rotary door is formed with openings in its circumferential wall having an arcuate shape. The film member having ventilation holes to lap one of the openings is mounted with a slight slackness on the outer circumference of the rotary door. When this rotary door is rotationally displaced by a control cable, the air passages lapping the ventilation holes are opened, whereas the remaining air passages are closely sealed up by the film member which is expanded by a wind pressure.

10 Claims, 11 Drawing Sheets

AIR PASSAGE SWITCHING DEVICE AND VEHICULAR AIR CONDITIONER

CROSS REFERENCE TO RELATED APPLICATIONS

This application is based upon and claims priority from Japanese Patent Application No. Hei 6-97300 filed May 11, 1994 and Japanese Patent Application No. Hei 6-299421 filed Dec. 2, 1994, with the contents of each document being incorporated herein by reference.

BACKGROUND OF THE INVENTION

1. Field of the Invention

The present invention relates to an air passage switching device and a vehicular air conditioner, which are constructed to open/close an air passage in an air duct by means of a rotary door.

2. Description of the Related Art

In an air conditioner for an automobile, for example, a compartment is fed through an air duct with a cool or warm wind which is prepared by a blower and a cooler (e.g., an evaporator) or a heater (e.g., a heater core). In this case, the air duct is equipped with air passages individually communicating with a plurality of outlets (e.g., FACE, FOOT, DEF and so on), and those air passages are opened/closed by a plurality of plate-shaped dampers on the basis of the operations of a blow mode switching lever in the compartment.

In this case, the blow mode switching lever is connected to one end of a control cable, which has its other end connected to a link mechanism to actuate the plurality of dampers. In the construction having these dampers to be actuated, the link mechanism is so considerably complicated as to increase the number of parts remarkably.

In Japanese Utility Model Application Laid-Open No. Sho 50-65151, on the other hand, there is disclosed a technique in which a cylindrical rotary damper is rotatably disposed in a distribution box so that the outlets may be switched by the single rotary damper. Moreover, the rotary damper is equipped at its outer circumference with a wind baffle plate which is made of a synthetic resin for preventing the wind leakage by coming into elastic contact with the inner face of the distribution box. As a result, the complicated link mechanism for actuating the plurality of dampers is eliminated to simplify the construction to an extent.

However, the aforementioned construction of Japanese Utility Model Application Laid-Open No. Sho 50-65151 may have the following disadvantages. Specifically, the wind baffle plate is a relatively rigid molding and may fail to come into complete contact with the inner face of the distribution box thereby to allow a wind leakage. After a long use or in a heated state, moreover, the wind baffle plate may creep to lose its elastic force thereby to cause the disadvantage of the wind leakage. Because of the structure for holding the wind baffle plate on the inner face of the distribution box, still moreover, the operating force required for turning the rotary damper is increased to invite another disadvantage that a sliding or chattering noise is caused.

SUMMARY OF THE INVENTION

It is an object to provide an air passage switching device and a vehicular air conditioner, which can open/close one or more air passages by a simple construction but can effectively prevent the wind leakage.

According to one preferred mode of the present invention, there is provided an air passage switching device for opening/closing an air passage including an air duct having an air flow therein; at least one air opening disposed downstream of the air duct; a film member disposed in the air duct to be opposite to said air opening and opening/closing the air opening, the film having flexibility; a supporting member supporting the film member, whereby when the air opening is closed by the film member, the film member contacts to seal the air opening by being forced to press a circumferential edge of the air opening with bending toward an outer circumference by a wind pressure of the air flow.

According to another preferred mode of the present invention, in an air passage switching device, the supporting member is a rotary door having a circumferential wall formed into an arcuate face and rotatably disposed in the air duct in a position to face the air passage and mounted on an outer face of the circumferential wall of the rotary door.

The air passage is opened/closed by turning the rotary door. In case a plurality of air passages are opened/closed, for example, they can be switched by the single rotary door so that the construction can be simplified. Moreover, when the air passages are closed, they are sealed up such that the film member mounted on the outer face of the rotary door is forced to contact the circumferential edges of the air passages by the wind pressure. Since, in this case, the film member is less rigid than a plate member so that it can come into close contact with the circumferential edges of the air passages to prevent the wind leakage without fail. Since, moreover, the sliding resistance can be reduced, the operating force can be reduced to suppress the sliding noise.

DETAILED DESCRIPTION OF THE PRESENTLY PREFERRED EXEMPLARY EMBODIMENTS

Several embodiments, in which the present invention is applied to an automotive air conditioner (or car air conditioner), will be described in the following with reference to the accompanying drawings.

[First Embodiment]

Figure 1:
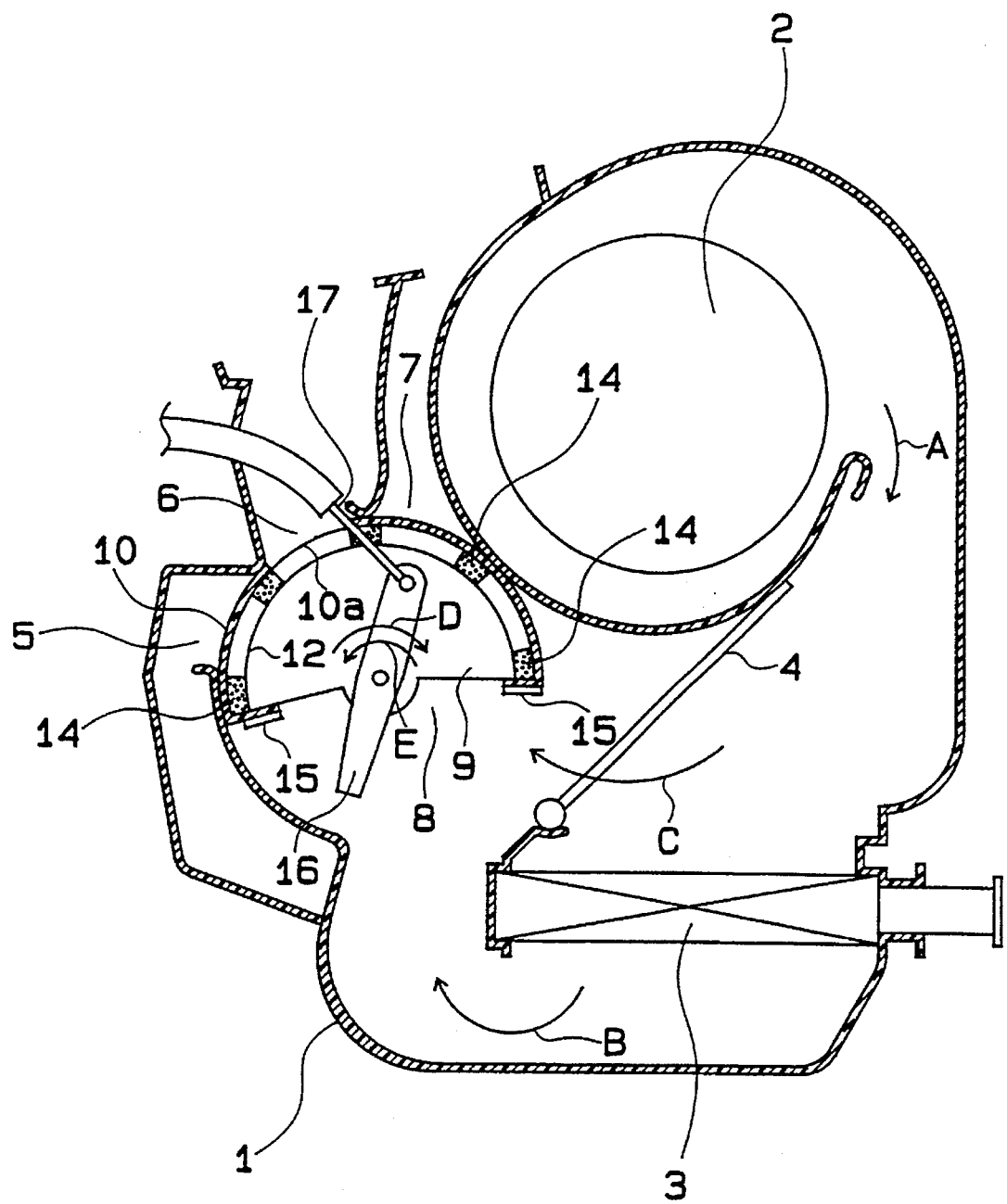
FIG. 1 is a schematic longitudinally sectional view of an air duct portion and shows a first embodiment of the present invention.

A first embodiment of the present invention will be described with reference to FIGS. 1 to 6. First of all, brief description will be made on the entire construction of a ventilation line of the car air conditioner. An air duct 1, as shown in FIG. 1, is arranged therein with a blower 2 acting as blower means, as located at the righthand upper portion of the drawing. This blower 2 sucks the air into the air duct 1 through the not-shown suction side duct which is connected to the air duct 1, and blows the sucked air in the direction of arrow A.

At this time, the suction duct is formed with an internal air intake and an external air intake and is equipped with a change-over damper for opening either of the air intakes. The suction duct is further arranged with an evaporator. This evaporator functions as cooling means when a refrigerating cycle is run.

As shown in FIG. 1, on the other hand, the air duct 1 is arranged with a heater core 3 acting as heating means, as located at the righthand lower portion of the drawing. Upstream of the heater core 3, moreover, there is disposed an air mixing damper 4. This air mixing damper 4 adjusts the flow rates of the air blown by the blower 2, between the flow in the direction of arrow B through the heater core 3 and the flow in the direction of C bypassing the heater core 3.

At the lefthand upper portion of the air duct 1 as viewed in FIG. 1, moreover, there are provided a plurality of, e.g., three air passages 5, 6 and 7 in this case. As also shown in FIG. 2, openings of these air passages 5, 6 and 7 are arranged along an arcuate shapes. These three air passages are designated the foot air passage 5, the face air passage 6 and the defroster air passage 7 consecutively in the clockwise from the left. Although not shown: the foot air passage 5 communicates with the foot air outlet in the compartment; the face air passage 6 communicates with the face air outlet; and the defroster air passage 7 communicates with the defroster air outlet.

Thus, when the blower 2 is driven, the internal air or external air is sucked from the suction duct and is introduced through the evaporator into the air duct 1. The air thus introduced flows in the air duct 1 in the direction of arrows A, B and C and is given a set temperature until it is blown via any of the air passages 5, 6 and 7 out of the corresponding air outlet. In the present embodiment, the air flow can be selected in five modes by the three air passages 5, 6 and 7, as will be described in detail hereinafter.

Now, there is disposed in this air duct 1 an air passage switching device 8 for switching the air passages 5, 6 and 7 by opening/closing them. The air passage switching device 8 according to the present embodiment will be described in the following with reference to FIGS. 3 to 6.

Figure 3:
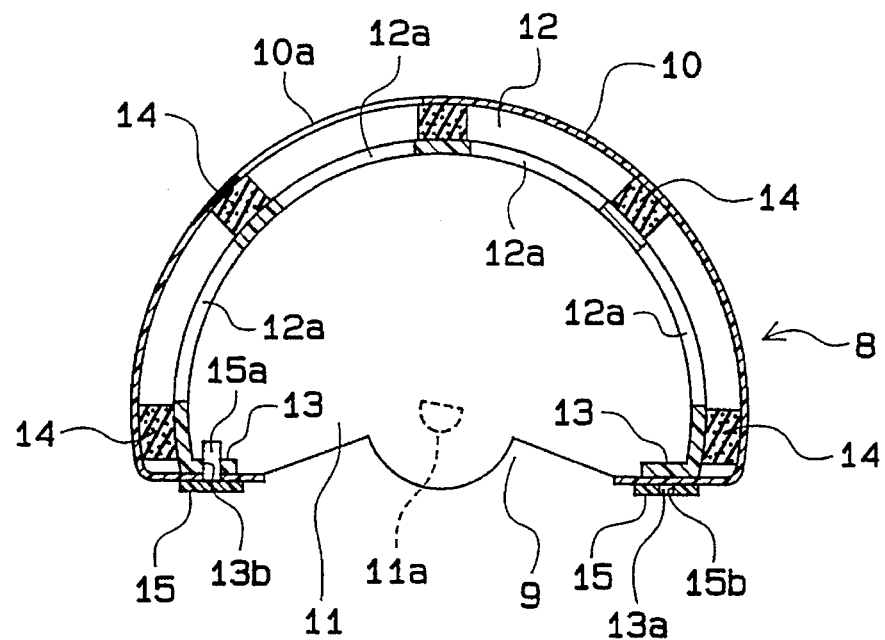
FIG. 3 is a longitudinally sectional view of a rotary door portion.
Figure 4:
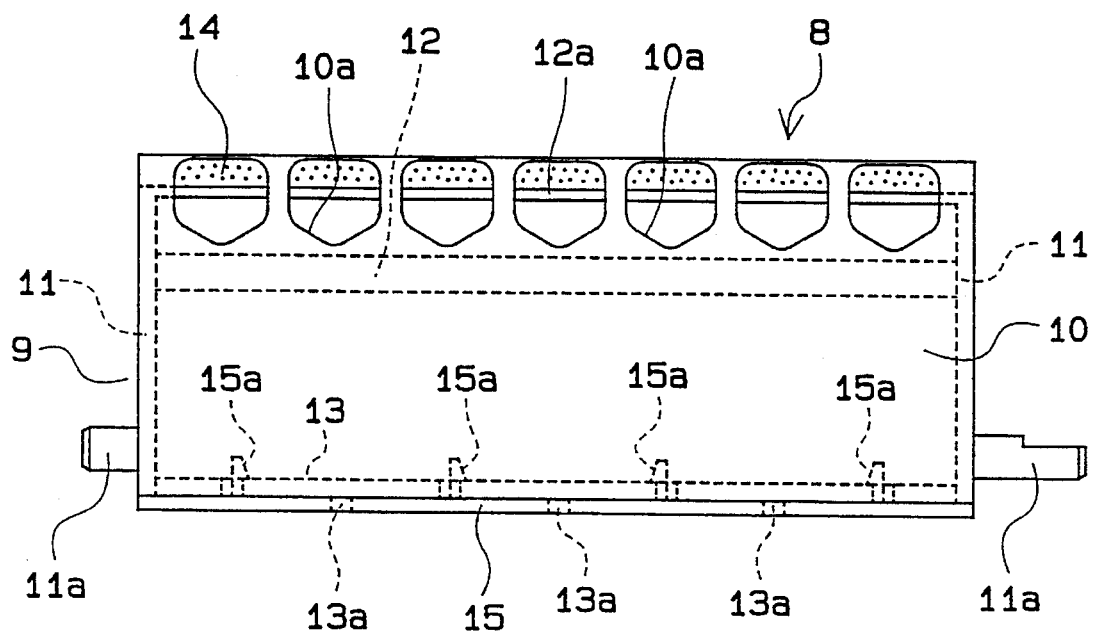
FIG. 4 is a front eview of the rotary door portion.
Figure 5:
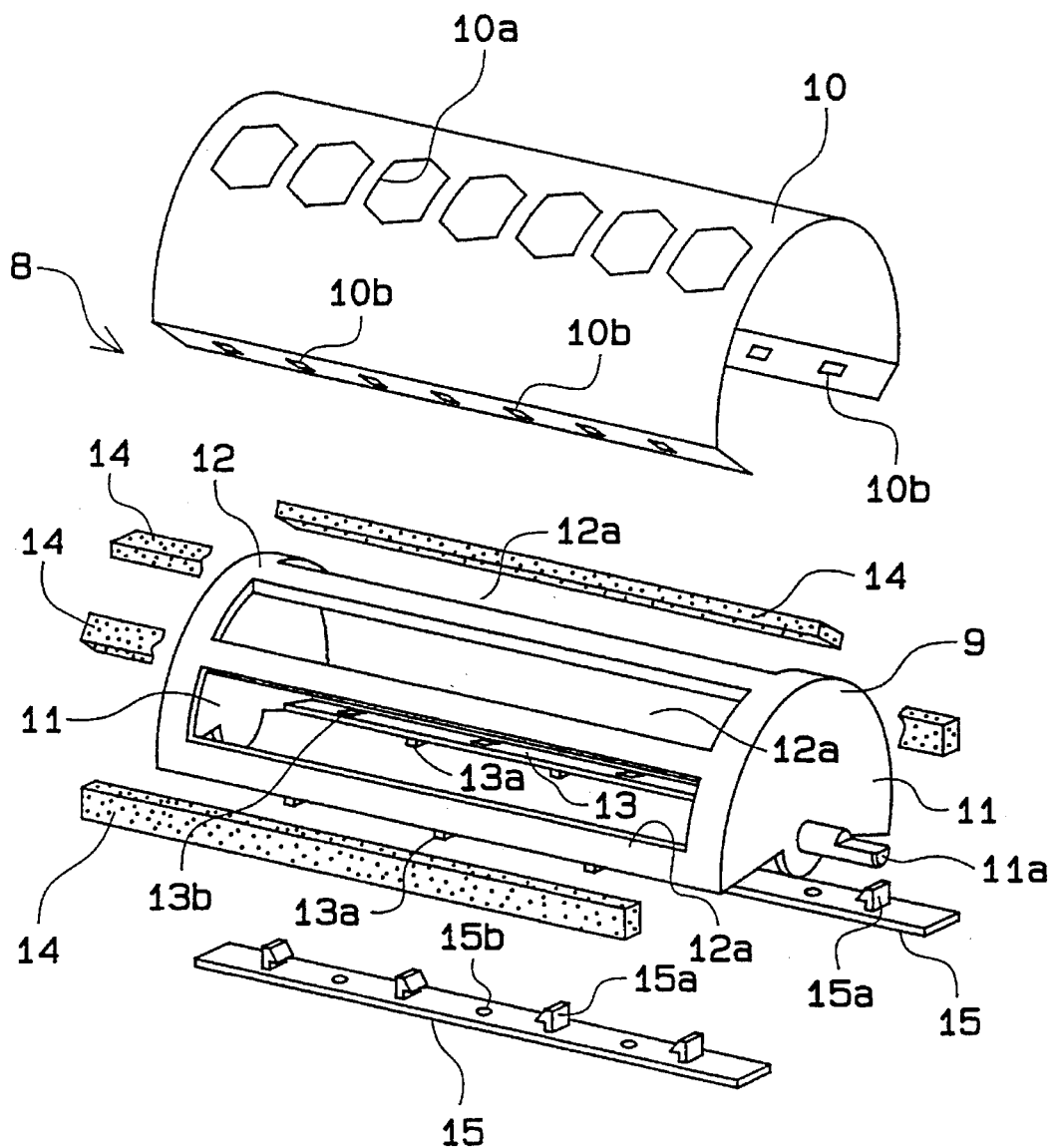
FIG. 5 is an exploded perspective view of the rotary door portion.

This air passage switching device 8 includes a rotary door 9 and a film member 10. Of these, the rotary door 9 is made of plastics, for example, and is longitudinally cut into, so to speak, a semicylindrical shape which is integrally formed of two generally semicircular end plates 11 and 11 and an arcuately circumferential wall 12, as shown in FIGS. 3 to 5. Moreover, the end plates 11 and 11 are equipped with stems 11a and 11a which are projected axially outwards from the center of curvature of the arc of the circumferential wall 12.

Moreover, the circumferential wall 12 is formed, as shown in FIGS. 5 and so on, with four axially elongated openings 12a which are substantially equidistantly arranged in the circumferential direction. Thus, the circumferential wall 12 is shaped such that the two circumferential end portions and the three portions between the individual openings 12a form axially extended slender ribs while leaving most portions opened. As shown in FIG. 3, on the other hand, the rotary door 9 is equipped with mounting portions 13 and 13 which are extended radially inwards from the two circumferentially edge portions of the circumferential wall 12 so as to mount the later-described film member 10. These mounting portions 13 are formed with several projections 13a and fitting holes 13b, as partially shown in FIGS. 3 and 5.

Figure 6:
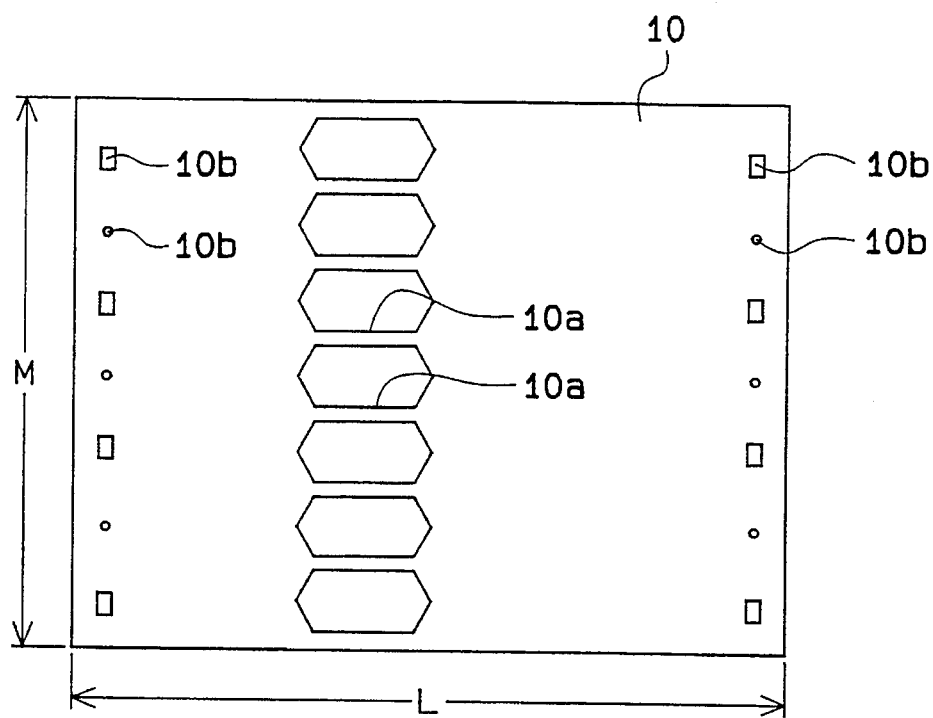
FIG. 6 is a top plan view of a film member before mounted.

On the other hand, the film member 10 is made of a PET film of 75 μm, for example, as having a flexibility, no air permeability and a low friction resistance and is formed into a generally rectangular shape having a width M substantially equal to the axial size of the circumferential wall 12 of the rotary door 9, as shown in FIG. 6. Moreover, the film member 10 is formed in its longitudinally intermediate portions with a plurality of ventilation holes 10a which are arranged in the widthwise direction. In this case, each of the ventilation holes 10a is formed into a generally hexagonal shape. Moreover, this film member 10 is formed at its two longitudinal end portions (as located at the lefthand and righthand edge portions in FIG. 6) with a plurality of mounting holes 10b. Specifically, these mounting holes 10b are alternately arranged with circular holes to be fitted on the projections 13a of the mounting portions 13, and slots to lap the fitting holes 13b.

This film member 10 covers the outer face portion of the circumferential wall 12 of the rotary door 9. At this time, as shown in FIGS. 3, 5 and so on, there are adhered, for example, to the outer face of the circumferential wall 12 elastic members 14 which are made of axially elongated foamed urethane, for example, and which are positioned on the two circumferential end portion and the three axially extending ribs between the individual openings 12a. For mounting this film member 10, moreover, there are used in this case film holding plates 15 and 15, as shown in FIGS. 3, 5 and so on. Each of these film holding plates 15 is formed into an extending thin plate corresponding to the mounting portion 13 and is alternately equipped thereon with fitting pawls 15a to be fitted in the fitting holes 13b of the mounting portion while being prevented from coming out, and circular holes 15b to be fitted on the projections 13a.

When the film member 10 is to be mounted on the rotary door 9, its two end portions are folded at first radially inwards to cover the outer circumference of the circumferential wall 12 of the rotary door 9, as shown in FIG. 5, to individually fit the mounting holes 10b (or circular holes) on the projections 13a of the mounting portions 13. In this state, the film holding plates are attached such that their fitting pawls 15a are fitted through the mounting holes 10b (or slots) in the fitting holes 13b of the mounting portions 13, as shown in FIGS. 3 and so on. Thus, the film member 10 is fixed while having its two end portions sandwiched between the mounting portions 13 and the film holding plates 15.

At this time, the film member 10 has a length L (as shown in FIG. 6) made slightly larger than the sum of the virtual circumferential length formed by the outer circumference of the elastic members 14 and the length of the folded portions for mounting the two ends. As a result, the film member 10 is held with a slight slackness in a curved shape along the outer circumference of the circumferential wall 12 of the rotary door 9 by the elastic members 14. Moreover, the ventilation hole 10a of the film member 10 lap the second one, as counted clockwise from the circumferential lefthand end of FIGS. 1 to 3, of the four openings 12a of the rotary door 9 thereby to provide communication between the inner and outer circumferential portions of the rotary door 9 through that ventilation hole 10a.

The rotary door 9 thus constructed is rotatably mounted in the air duct such that its two end plates 11 have their stems 11a so pivotally supported in the walls of the air duct 1 as are aligned with the center of curvature of the arcuate face in which the air passages 5, 6 and 7 are arrayed. At this time, as shown in FIGS. 1 and 2, the circumferential wall 12 of the rotary door 9 faces the air passages 5, 6 and 7, and the virtual arcuate plane formed by the outer circumferences of the elastic members 14 is spaced at a small clearance (e.g., about 0.5 mm) from the circumferential edges of the individual air passages 5, 6 and 7.

In this case, moreover, there is fixed to one of the stems 11a a lever 16 which has its end portion connected to one end of a control cable 17, as shown in FIG. 1. The other end of this control cable 17 is connected to the (not-shown) blow mode switching lever disposed in the compartment to act as switching operation means. As a result, the rotary door 9 is rotatably (in the directions of arrows D and E of FIG. 2) displaced by operating the blow mode switching lever. Thus, the air passage switching device 8 to open/close the individual air passages 5, 6 and 7 in accordance with the position of the blow mode switching lever, as will be described in the following operations.

Here will be described the operations of the construction described above. As the blower 2 is driven, the air flows in the air duct 1, as indicated by the direction of arrows A, B and C in FIG. 1, to reach the inner circumference of the rotary door 9, as described above. The air then flows through the second opening 12a of the circumferential wall 12 of the rotary door 9 and through the ventilation hole 10a of the film member 10 lapping the second opening 12a, until it reaches the individual outlets in the compartment via the individual air passages 5, 6 and 7. At this time, moreover, the film member 10 is expanded toward the outer circumference by the wind pressure to come into contact with the circumferential edges of the air passages 5, 6 and 7 to be closed, thereby to seal up the air passages 5, 6 and 7.

In the present embodiment, the user operates the blow mode switching lever in the compartment. This operating force is then directly transmitted through the control cable 17 and the lever 16 to the rotary door 9 so that this rotary door 9 is disposed in the direction of arrow D or E. At this time, more specifically, the rotary door 9 is displaced to each of the positions, as shown in FIG. 2, to select one of the five blow modes.

Figure 2A:
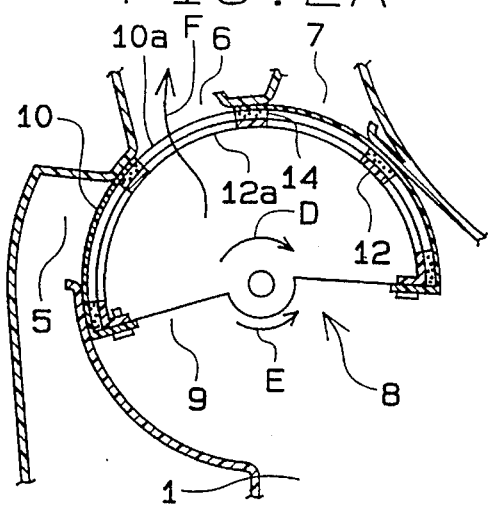
FIGS. 2A through 2E are longitudinally sectional views of essential portions and show the positions of rotary doors in five kinds of modes.

Specifically, when the "FACE Mode" is selected by the blow mode switching lever, as shown in FIG. 2A, the ventilation hole 10a of the film member 10 laps the face air passage 6 so that the air in the air duct 1 is blown, as indicated by arrow F, via the face air passage 6 out of the face outlet in the compartment. At this time, the film member 10 is expanded toward the outer circumference by the wind pressure so that it is forced into contact with the circumferential edges of the remaining air passages 5 and 7 to shut the air passages 5 and 7 hermetically without fail.

Figure 2B:
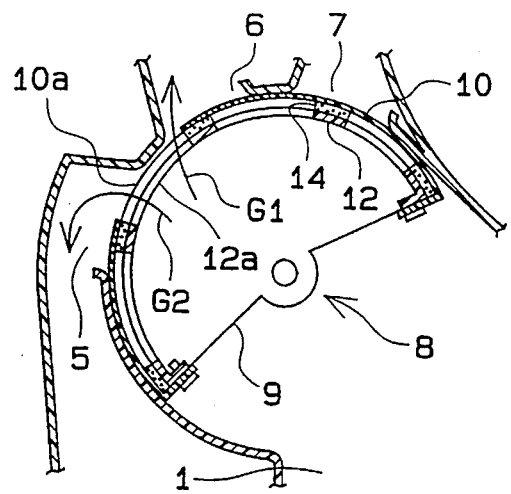

FIG. 2B shows the behavior when the "BI-LEVEL Mode" is selected. In this state, the ventilation hole 10a of the film member 10 laps both a portion of the foot air passage 5 and a portion of the face air passage 6 so that the air in the air duct 1 is blown, as indicated by arrows G1 and G2, via the two air passages 5 and 6 out of both the foot outlet and the face outlet. At this time, moreover, the film member 10 is forced to contact with the circumferential edges of the defroster air passage 7 thereby to shut the air passage 7.

Figure 2C:
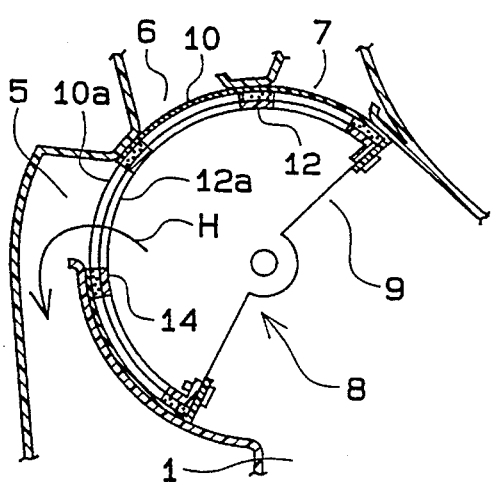

FIG. 2C shows the behavior when the "FOOT Mode" is selected. In this state, the ventilation hole 10a laps the foot air passage 5 so that the air in the air duct 1 is blows, as indicated by arrow H, via the foot air passage 5 out of the foot outlet. At this time, moreover, the film member 10 shuts the remaining air passages 6 and 7.

Figure 2D:
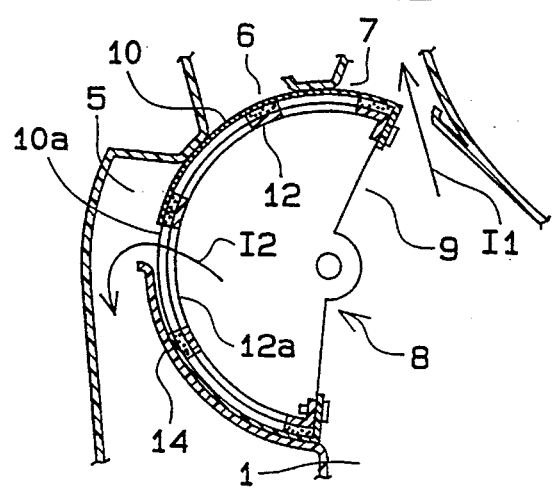

FIG. 2D shows the behavior when the "FOOT/DEF Mode" is selected. Then, the ventilation hole 10a laps a portion of the foot air passage 5, and the rotary door 9 has its end portion positioned in an intermediate portion of the defroster air passage 7 to open the air passage 7. As a result, the air in the air duct 1 is blown, as indicated by arrows I1 and I2, via the two air passages 5 and 7 out of both the foot outlet and the defroster outlet. At this time, moreover, the film member 10 is forced to contact with the circumferential edges to shut the air passage 6.

Figure 2E:
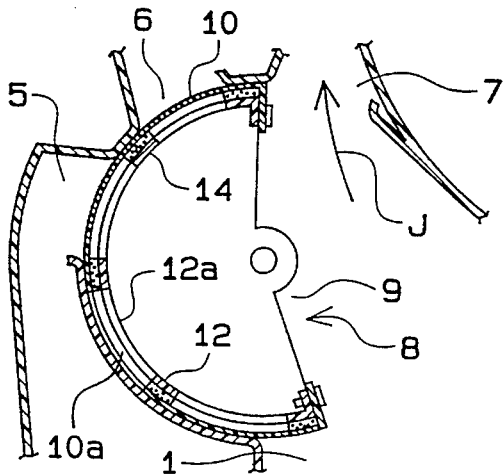

FIG. 2E shows the behavior when the "DEF Mode" is selected. In this state, the rotary door 9 is retracted in the direction of arrow E from the defroster air passage 7 so that the air in the air duct 1 is blown in the direction of arrow J via the defroster air passage 7 out of the defroster outlet. At this time, moreover, the film member 10 is forced to contact with the circumferential edges of the foot air passage 5 and the face air passage 6 to shut these air passages 5 and 6.

Thus, according to the present embodiment, the plurality of air passages 5, 6 and 7 are opened/closed by the rotational displacement of the single rotary door 9 so that the construction of the rotary door 9 itself and the construction for displacing the rotary door 9 can be simplified. Especially in the present embodiment, the film member 10 is made of one sheet having the ventilation holes 10a so that the film member 10 itself and its mounting structure can be simplified. Moreover, the rotary door 9 is directly displaced by the control cable 17 connected to the blow mode switching lever so that the rotary door 9 can be rotationally displaced without fail by the remarkably simple construction.

Moreover, the film member 10 mounted on the outer face of the rotary door 9 is forced into contact to seal the circumferential edges of the air passages 5, 6 and 7 by the wind pressure thereby to shut the air passages 5, 6 and 7. As a result, the film member 10 can be made less rigid than the wind leakage preventing plate so that it can be brought into closer contact with the circumferential edges of the air passages 5, 6 and 7 thereby to prevent the wind leakage reliably. Thanks to the construction in which the film member 10 is forced into contact by the wind pressure, moreover, the frictional force can be so low as to reduce the sliding resistance, and the operating force can be lowered while suppressing the sliding noise.

Especially in the present embodiment, moreover, the elastic members 14 are sandwiched between the circumferential wall 12 of the rotary door 9 and the film member 10 so that the film member 10 can have its shape retained in the curved shape contouring the circumferential wall 12. As a result, there can be attained an advantage that the film member 10 can be held with neither large slackness nor undulation.

Incidentally, in the first embodiment thus far described, the film member 10 is made of a sheet of PET film, but may be exemplified by various materials such as films of other plastics or paper if they have a flexibility and no air permeability. Moreover, the film member may be made of a plurality of sheets of members. As the structure for mounting the film member, still moreover, there can be adopted means using rivets or screws, or adhering or welding means.

Moreover, the rotary door should not be limited to the semi-cylindrical shape, but various shapes can be conceived including a fully cylindrical shape. On the other hand, the openings of the circumferential wall should not be limited to the plurality of axially elongated openings but can be prepared by forming a number of holes over the entirety of the circumferential wall or by making the circumferential wall of a net member. Still moreover, the rotary door driving structure should not be limited to that for directly driving the control cable 17 by the blow mode switching lever, but the rotary door may be rotationally displaced by an electric switch and another drive source such as a motor to be energized by the action of the switch.

[Second Embodiment]

Figure 7:
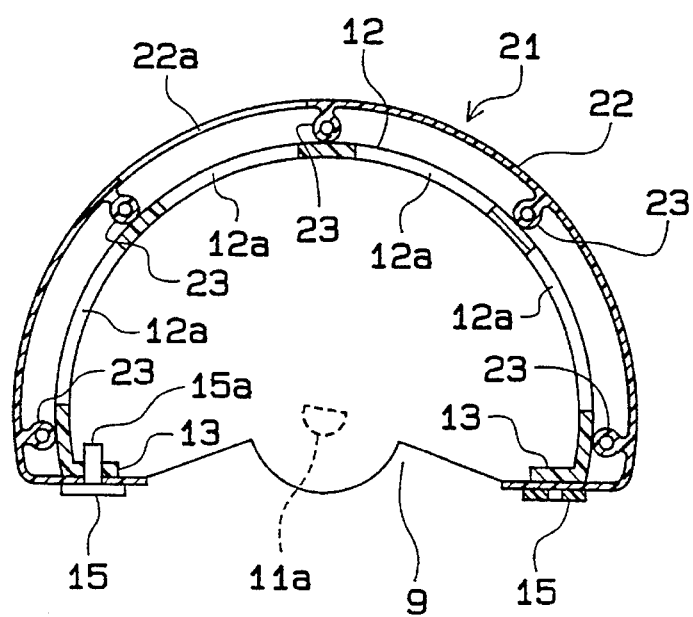
FIG. 7 is a longitudinally sectional view of a rotary door portion and shows a second embodiment of the present invention.

Next, FIG. 7 shows a second embodiment of the present invention. An air passage switching device 21 according to present embodiment is different from that of the foregoing first embodiment in that a film member 22 formed with ventilation holes 22a has its inner circumference integrally formed with elastic ridges 23 for performing a function similar to that of the aforementioned elastic members 14.

Specifically, the air passage switching device 21 is constructed by mounting the film member 22, which is made of a plastic film of polyethylene terephthalate or the like, on the outer face of the circumferential wall 12 of the rotary door 9 similar to that of the foregoing first embodiment. At this time, as shown in FIG. 7, the film member 22 is integrally formed on its inner circumference with the totally five elastic ridges 23 which are made of generally cylindrical hollow tubes extending in the axial direction and which correspond to the slender ribs axially extending at the two circumferential end portions of the circumferential wall 12 and the three portions between the individual openings 12a.

The film member 22 thus constructed is also attached at its two end portions to the rotary door 9 by the film holding plates 15. At this time, the film member 22 is so held in a curved shape contouring the outer circumference that the elastic ridges 23 have their leading ends contacting with the circumferential wall 12 of the rotary door 9.

Thus, according to the present embodiment, the elastic ridges 23 for performing the same function as that of the elastic members 14 of the foregoing first embodiment are integrally formed with the film member 22 so that the film member 22 can be held with neither large slackness nor undulation. As compared with the case in which the elastic members 14 are made separate, the number of parts can be reduced to simplify the construction and the assembling process.

Figure 8:
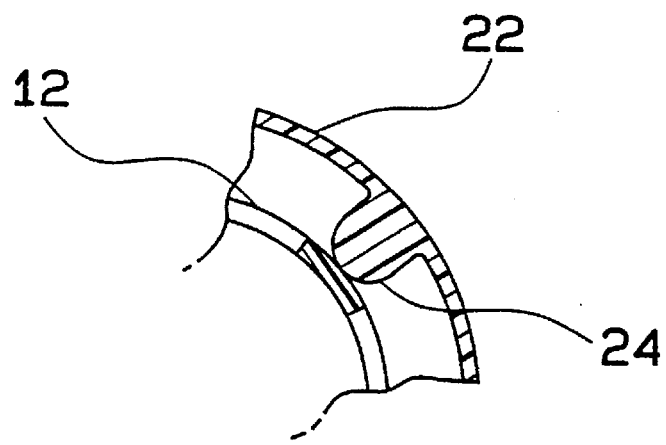
FIG. 8 is a partial sectional view of a main portion and shows a modification of an elastic ridge.
Figure 9:
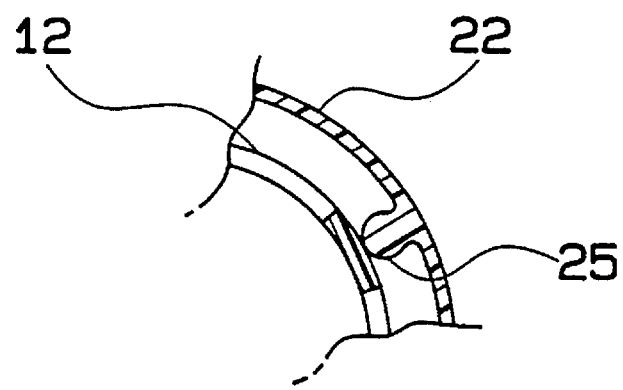
FIG. 9 is a partial sectional view of a main portion and shows another modification of an elastic ridge.

On the other hand, FIGS. 8 and 9 individually show modifications, in which the elastic ridges to be formed integrally with the inner circumference of the film member 22 have different shapes. In these modifications, the elastic ridges need not be made of the hollow tubes but can be formed to have a generally semicircular section as of an elastic ridge 24, as shown in FIG. 8, or a generally circular section as of an elastic ridge 25, as shown in FIG. 9. It is quite natural that other shapes can be adopted.

[Third Embodiment]

Figure 10:
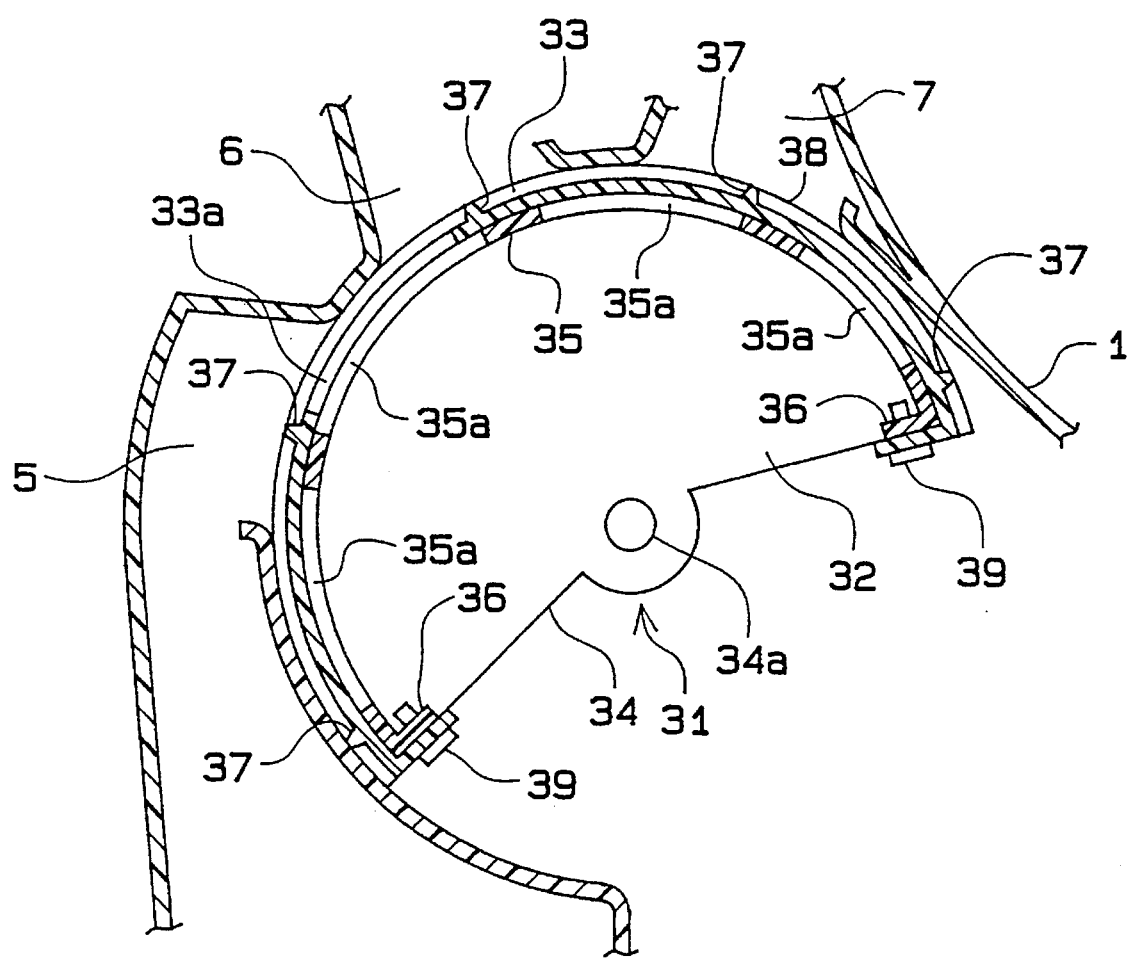
FIG. 10 is a partial sectional view of a rotary door portion and shows a third embodiment of the present invention.
Figure 11:
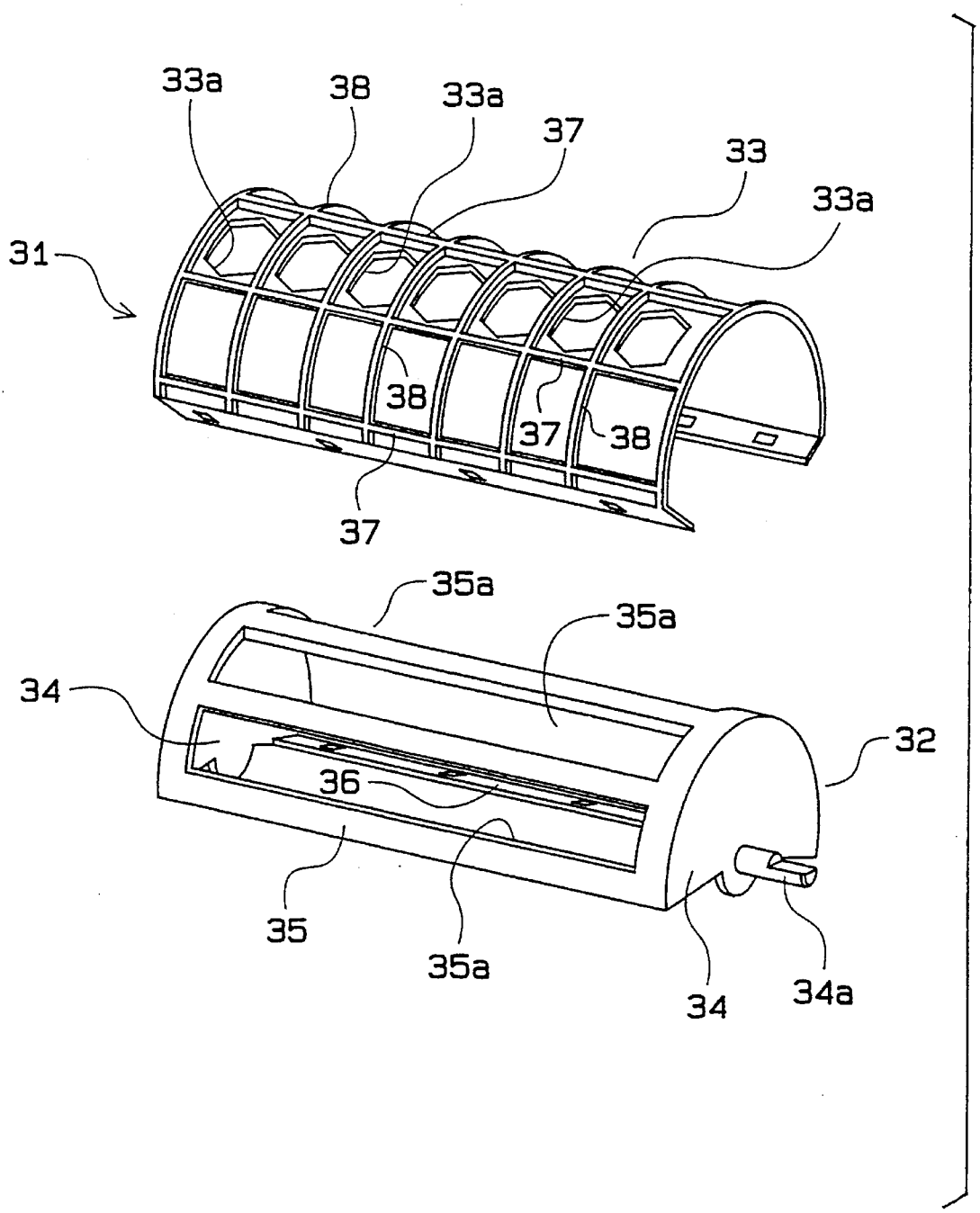
FIG. 11 is an exploded perspective view of the rotary door portion.

Next, FIGS. 10 and 11 show a third embodiment of the present invention. An air passage switching device 31 according to this third embodiment is also constructed to include a rotary door 32 made of plastics and a sheet of film member 33 made of a polyethylene terephthalate film, for example, and having a flexibility, no air permeability and a low friction resistance.

In this case, the rotary door 32 has a basic construction similar to that of the rotary door 9 of the foregoing first embodiment and is integrally constructed of: two semicircular end plates 34 and 34 having stems 34a; a circumferential wall 35 having four openings 35a; and mounting portions 36 and 36. Moreover, the rotary door 32 is given an external diameter slightly larger than that of the rotary door 9 of the first embodiment.

Moreover, the film member 33 is integrally formed on its outer circumference with a plurality of axially extending ridges 37 and a plurality of ridges 38 extending in a direction (i.e., circumferential direction) perpendicular to the former. Thus, the plurality of ridges 37 and 38 form a rib lattice on the outer face of the film member 33. The ventilation holes 33a of the film member 33 are so axially arranged in the sections of the lattice as to correspond to one opening 35a in the circumferential wall 35 of the rotary door 32. In this case, the ridges 37 and 38 are formed into a generally triangular section having a shape edge.

The film member 33 thus formed is so attached at its two end portions to the mounting portions 36 and 36 by film holding plates 39 and 39 as to cover the outer circumference of the circumferential wall 35 of the rotary door 32. At this time, the film member 33 has its inner circumference given such a length as to substantially contact with the outer face of the circumferential wall 35 of the rotary door 32.

Moreover, the virtual arcuate plane formed by the edges of the ridges 37 and 38 is positioned outside of the arcuate plane containing the individual air passages 5, 6 and 7. In other words, the ridges 37 and 38 have their edges forced to contact with the circumferential edge of the individual air passages 5, 6 and 7.

With the construction described above, the air introduced into the air passage switching device 31 flows to the individual outlets in the compartment from the individual air passages 5, 6 and 7 through the second opening 35a of the circumferential wall 35 of the rotary door 32 and the ventilation holes 33a of the film member 33 lapping the former. At this time, the film member 33 is expanded toward the outer circumference by the wind pressure so that the ridges 37 and 38 of its outer circumference are forced into contact to seal the circumferential edges of the air passages 5, 6 and 7 to be shut, thereby to prevent the wind leakage without fail.

In the present embodiment, moreover, the ridges 37 and 38 integrally formed on the outer circumference of the film member 33 are brought, so to speak, into linear contact with the circumferential edges of the air passages 5, 6 and 7. As a result, the present embodiment can achieve an advantage that sealing properties can be improved and retained even in case the wind pressure is low. Moreover, the sliding resistance can be reduced to reduce the operating force and suppress the sliding noise. Still moreover, the elastic members 14 of the foregoing first embodiment can be eliminated to reduce the number of parts. Thanks to the lattice-shaped ridges 37 and 38, furthermore, the strength of the film member 33 itself can be improved to make the film member 33 thinner.

Incidentally, according to this third embodiment, the film member 33 has its outer circumference formed with the ridges 37 and 38 in the lattice shape. However, the desired purpose such as an improvement in the sealing properties or a reduction of the sliding resistance can be achieved if the film member 33 has its outer circumference formed with at least the plurality of axially extending ridges 37. Moreover, the film member 33 may be additionally formed with the elastic members 14 of the first embodiment or the elastic ridges 23 of the second embodiment.

Finally, FIGS. 12 to 17 show a fourth embodiment of the present invention. An air passage switching device 41 according to the present embodiment is different from the air passage switching devices 8 and so on of the foregoing first to third embodiments in that a rotary door 42 and a film-shaped block member 43 corresponding to the film member are integrally molded of a plastic material such as an elastomer.

Figure 17:
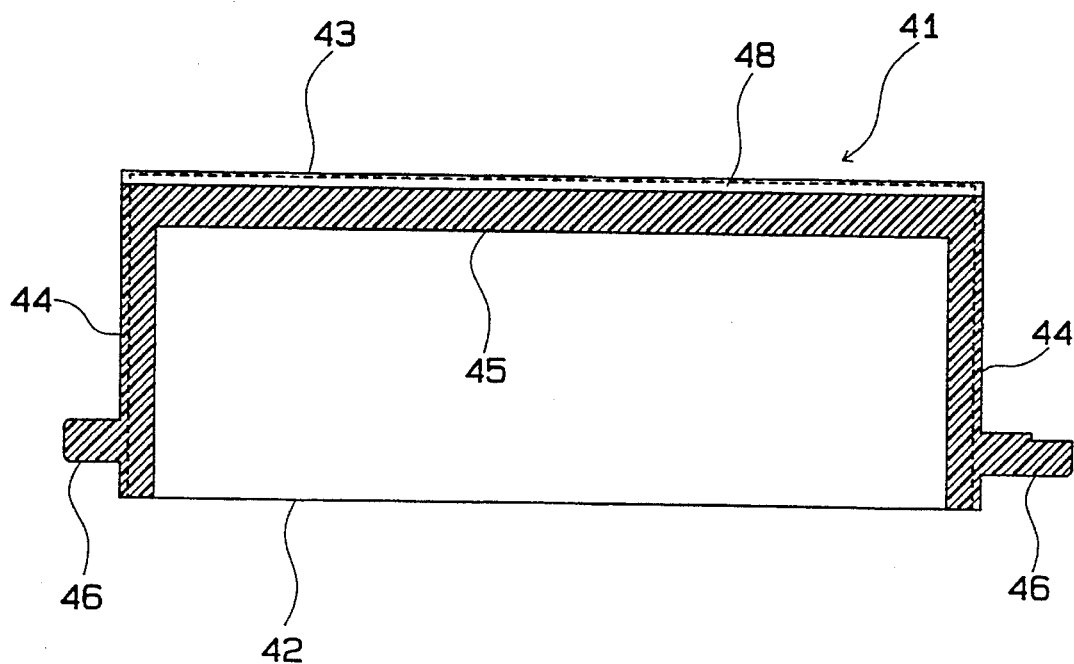
FIG. 17 is a sectional view taken along line XVII—XVII of FIG. 14.

Of these, the rotary door 42 is made of a hard material and is constructed of: generally semicircular end plates 44 and 44 facing each other; and a generally C-shaped (as shown in FIG. 17) rib 45 which is radially extended at the central portions of the facing inner faces of those end plates 44 and 44 and extended to join the outer circumferential ends of the end plates 44 and 44. As a result, the rotary door 42 is formed into a semicylindrical shape which has its circumferential wall almost opened excepting the rib 45. On the other hand, the end plates 44 and 44 have their outer faces individually integrated with stems 46 and 46.

The lever 16 is also fixed on one stem 46, although not shown, so that the rotary door 9 is rotationally displaced by operating the blow mode switching lever in the compartment through that lever 16 and the control cable 17. Incidentally, the stems are made of a single through stem. In this case, the single stem can be easily molded by the insert molding or by welding the stem to the rear end plate 44 made separate.

Moreover, the block member 43 integrated with the rotary door 42 is made of a thin sheet having a low friction resistance and a flexibility and is formed into an arcuate plane having a slightly larger diameter than the virtual arcuate plane which is formed by the outer circumference (or the circumferential wall of the rotary door 42) of the end plates 44 and 44. In this case, the block member 43 is circumferentially halved at the intermediate portion (i.e., the aforementioned rib 45). One half continuously extends from the upper end of the rib 45 to one circumferential end portion, whereas the other half also continuously extends from the upper end of the rib 45 to the other circumferential end portion. Incidentally, the block member 43 is formed in its suitable portion with ventilation holes 43a.

Figure 12:
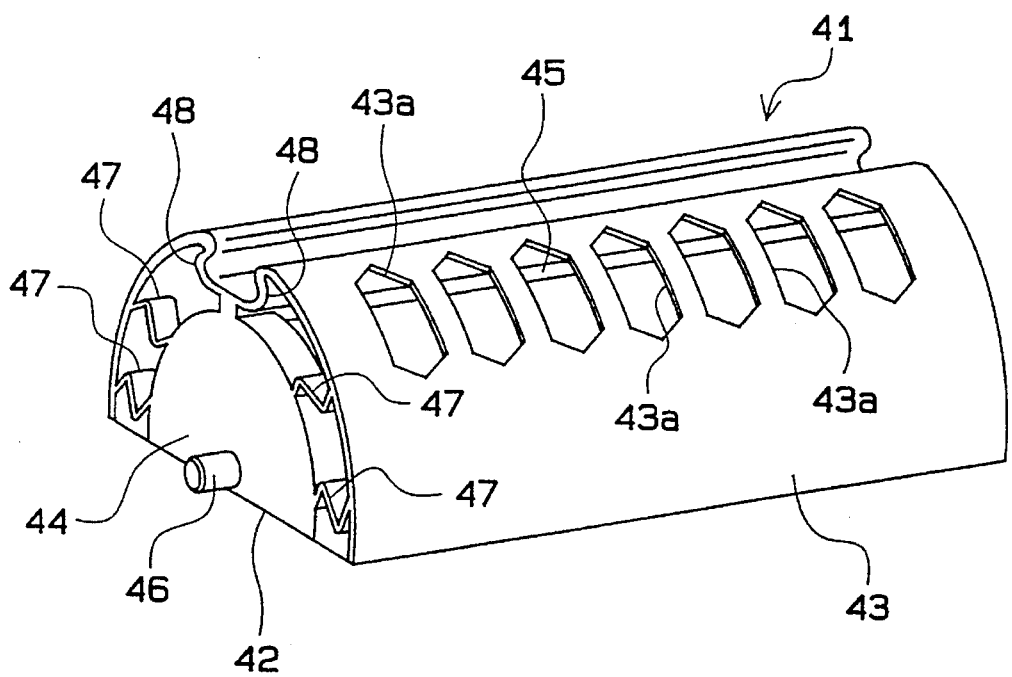
FIG. 12 is a perspective view of a rotary door and shows a fourth embodiment of the present invention.
Figure 13:
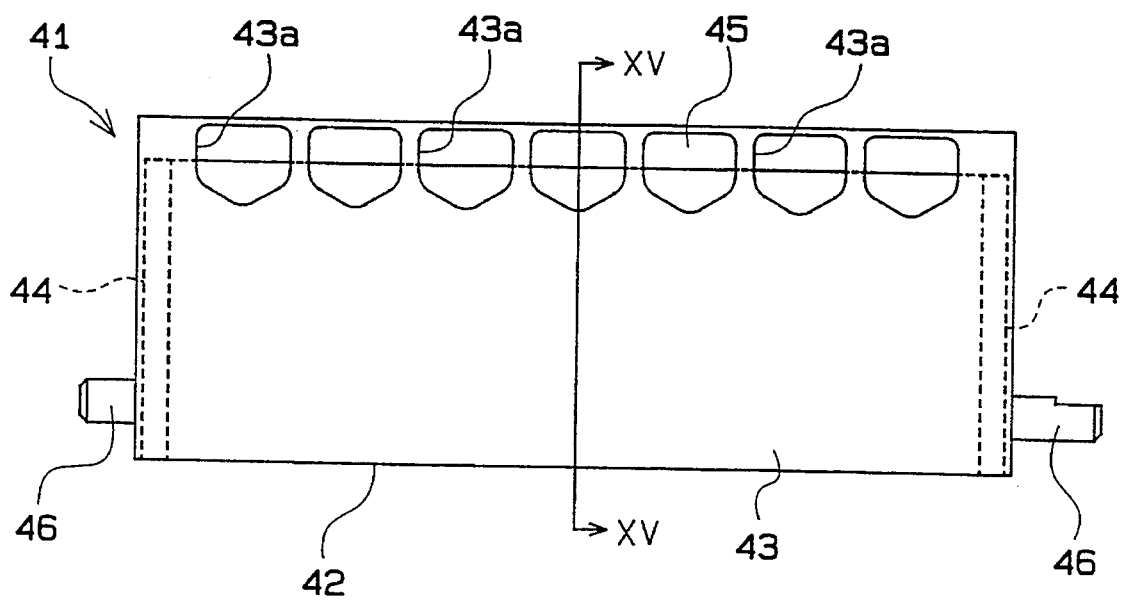
FIG. 13 is a front view of the rotary door.
Figure 14:
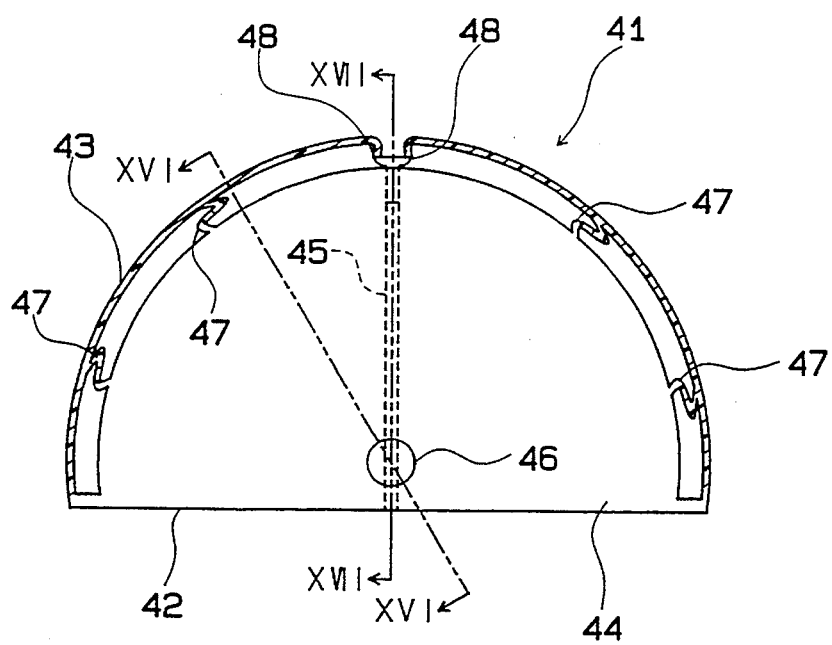
FIG. 14 is a side sectional view of the rotary door.
Figure 15:
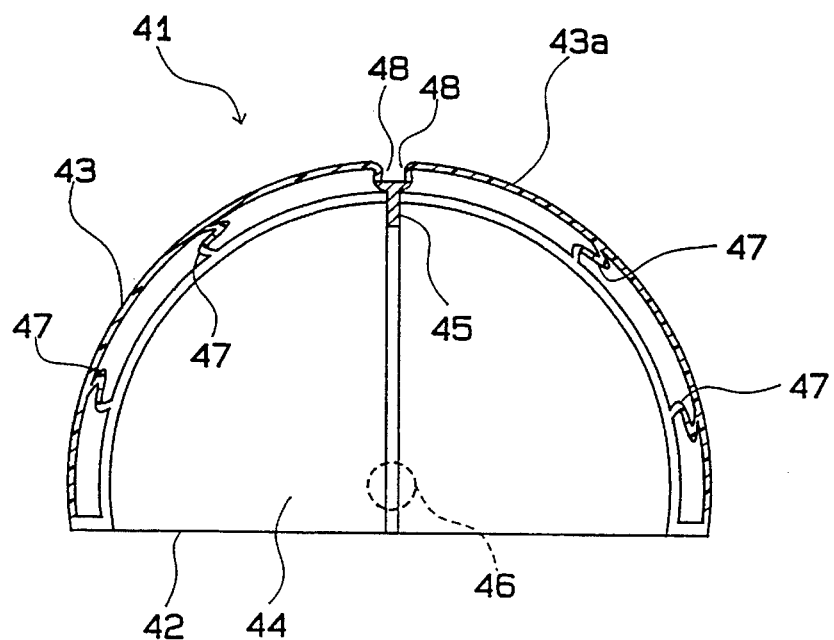
FIG. 15 is a sectional view taken along line XV—XV of FIG. 13.
Figure 16:
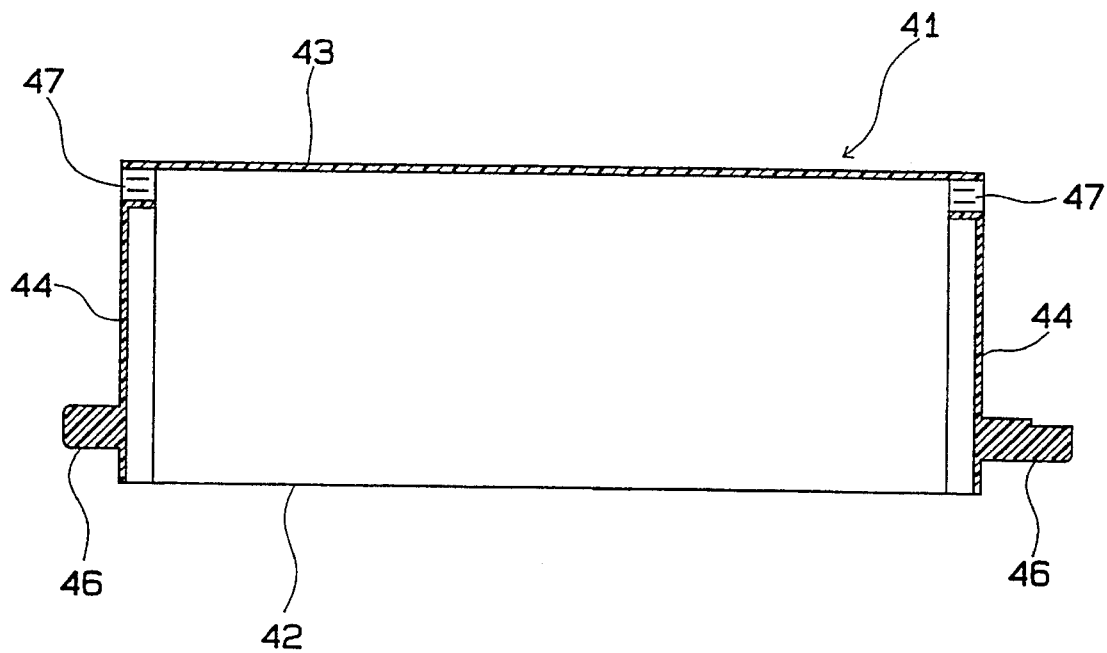
FIG. 16 is a sectional view taken along line XVI—XVI of FIG. 14.

Between the block member 43 and the individual end plates 44 and 44, moreover, there are interposed a plurality of connection portions 47 for connecting them. These connection portions 47 are formed into thin bands generally bent in an S-shape, as shown in FIGS. 12 and 14, so that they can be elastically extended and contracted. Moreover, the rib 45 and the block member 43 (or the leading ends of its halves) are also connected through bent portions 48 which can be elastically extended and contracted toward the outer circumference. Thus, when the block member 43 receives the wind pressure from the inside, the connection portions 47 and the bent portions 48 are elastically extended to bulge the block member 43 toward the outer circumference. When the wind pressure is released, the connection portions 47 and the bent portions 48 are elastically deformed to restore their initial shapes so that the block member 43 returns to its initial state.

In the air passage switching device 41 thus constructed, the air introduced into the rotary door 42 flows through the ventilation holes 43a of the block member 43 from the individual air passages 5, 6 and 7 into the individual outlets in the compartment. At this time, the block member 43 is expanded toward the outer circumference by the wind pressure so that it comes into contact to seal the circumferential edges of the air passages 5, 6 and 7 to be sealed, thereby to prevent the wind leakage without fail.

According to the present embodiment, too, the plurality of air passages 5, 6 and 7 can be switched as in the foregoing first embodiment and so on by the single rotary door 42 so that the construction can be simplified. In the present embodiment, moreover, the film-shaped block member 43 is made integral with the rotary door 42 so that the construction can be further simplified. Since the sliding resistance can be reduced, still moreover, the operating force can be reduced to suppress the sliding noise.

Especially in the present embodiment, moreover, the rotary door 42 and the block member 43 are connected through the plurality of connection portions 47 and bent portions 48 which can be elastically expanded and contracted toward the outer circumference, so that the block member 43 can be easily displaced toward the outer circumference to come into close contact with the circumferential edges of the air passages 5, 6 and 7. With no wind pressure, on the other hand, the block member 43 returns in the radially constricting direction so that it is released from the forced contact with the circumferential edges of the air passages 5, 6 and 7. As a result, there can be attained an advantage that the block member 43 can be prevented from any deformation.

Incidentally, the present invention should not be limited to the foregoing individual embodiments. For example, the film members 10, 22 and 33 are made of a sheet of polyethylene terephthalate film, but this film can be exemplified by various materials such as other plastics or paper if it has a flexibility and no air permeability. Moreover, the film member can also be formed of a plurality of sheets. As the structure for mounting the film member, still moreover, there can be adopted means using rivets or screws, or adhering or welding means.

Moreover, the rotary door should not be limited to the semi-cylindrical shape, but various shapes can be conceived including a fully cylindrical shape. On the other hand, the openings of the circumferential wall should not be limited to the plurality of axially elongated openings but can be prepared by forming a number of holes over the entirety of the circumferential wall or by making the circumferential wall of a net member. Still moreover, the rotary door driving structure should not be limited to that for directly driving the control cable 17 by the blow mode switching lever, but the rotary door may be rotationally displaced by an electric switch and another drive source such as a motor to be energized by the action of the switch.

In addition, the present invention can be practiced by suitably modifying it within the scope of the gist thereof such that it should not be limited to the vehicular air conditioner but can be applied to various devices for opening/closing air passages or to a device for opening/closing one air passage.

As is apparent from the description thus far made, the following excellent practical effects can be attained according to the present invention.

Specifically, according to the air passage switching device in the present invention, in which one or more air passages are to be opened/closed, the film member mounted on the outer face of the rotary door is expanded toward the outer circumference by the wind pressure when the air passages are closed, so that it is forced into contact to seal the circumferential edges of the air passage. As a result, the structure can be simplified while effectively preventing the wind leakage.

If, in this case, the film member is formed on its outer circumference with a plurality of ridges which are axially extended to be forced into contact with the circumferential edge of the air passage, the ridges are brought, so to speak, into linear contact with the circumferential edges of the air passages so that the sealing properties can be improved and retained even in case the wind pressure is low, while reducing the sliding resistance. In addition, the film member can have its strength improved.

If, on the other hand, the film member is fixed on the two circumferential ends of the circumferential wall of the rotary door and is made of a sheet of member, which is formed with a ventilation hole to lap the air passage when the air passage is opened and which has a width substantially equal to the axial size of the circumferential wall of the rotary door and a length slightly larger than the circumferential size of the circumferential wall, the single film member can be given the function of the ventilation hole for opening the air passage and the sealing function to shut the air passages, so that the construction can be more simplified.

If, moreover, there is interposed between the circumferential wall of the rotary door and the film member an elastic member for holding the shape of the film member along the curved shape of the circumferential wall, the film member is held with neither large slackness nor undulation. Alternatively, if the film member is integrally formed on its inner circumference with an elastic ridge for contacting with the circumferential wall of the rotary door to hold the shape of the film member along the curved shape of the circumferential wall, the film member is held with neither large slackness nor undulation, and the number of parts is reduced more than that of the case in which the elastic members is made separate.

According to the air passage switching device of the present invention, moreover, a plurality of air passages can be switched, if intended to be opened/closed, by the single rotary door so that the construction can be simplified. This simplification of the construction is further promoted because the film-shaped block member is made integral with the rotary door. This block member is formed into the film shape so that it can come into close contact with the circumferential edges of the air passages thereby to prevent the wind leakage without fail. Since the sliding resistance can be reduced, the operating force can be reduced to suppress the sliding noise. If, in this case, the rotary door and the block member may be connected through a connection portion which can be elastically extended and contracted toward the outer circumference, the block member can be easily displaced toward the outer circumference by the wind pressure and can be positioned out of contact with the circumferential edges of the air passages when the wind pressure is absent. If, moreover, the rotary door can be displaced in the rotational direction by a control cable on the basis of the operation of switching operation means, the operating force can be directly and reliably transmitted through the control cable to simplify the construction for turning the rotary door.

Furthermore, there is provided a vehicular air conditioner which is characterized by comprising an air passage switching device. As a result, the construction for switching the plurality of outlets in the compartment can be simplified while effectively preventing the wind leakage.

What is claimed is:

1. An air passage switching device for opening/closing an air passage comprising:

an air duct having an air flow therein;

at least one air opening disposed downstream of said air duct;

a film member disposed in said air duct to be opposite to said air opening and opening/closing said air opening, said film member having flexibility;

a rotary supporting member supporting said film member, said film member being mounted on said supporting member, whereby when said air opening is closed by said film member, said film member contacts to seal said air opening by being forced to press a circumferential edge of said air opening with bending toward an outer circumference by a wind pressure of said air flow.

2. An air passage switching device for opening/closing an air passage comprising:

an air duct having an air flow therein;

at least one air opening disposed downstream of said air duct;

a film member disposed in said air duct to be opposite to said air opening and opening/closing said air opening, said film member having flexibility;

a supporting member supporting said film member, wherein said supporting member is a rotary door having a circumferential wall formed into an arcuate shape and rotatably disposed in said air duct in a position to face said air passage, said film member is mounted on an outer face of said circumferential wall of said rotary door, whereby when said air opening is closed by said film member, said film member contacts to seal said air opening by being forced to press a circumferential edge of said air opening with bending toward an outer circumference by a wind pressure of said air flow.

3. An air passage switching device as set forth in claim 2, wherein said film member is made of one film sheet member fixed at both circumferential ends of said circumferential wall of said rotary door, said film member has a ventilation hole to lap said air opening when said air passage is opened, said film member has a width length substantially equal to an axial length of the circumferential wall of said rotary door and a circumferencial length slightly larger than a circumferential length of said circumferential wall.

4. An air passage switching device as set forth in claim 3, further comprising an elastic member disposed between said circumferential wall of said rotary door and said film member for holding the shape of said film member along said arcuate face of said circumferential wall.

5. An air passage switching device as set forth in claim 3, wherein said film member has an elastic projection disposed an inner circumference thereof to hold the shape of said film member along said arcuate face of said circumferential wall.

6. An air passage switching device for opening/closing at least one air passage formed in an air duct for feeding air from an inside to an outside of said air duct, comprising:

a rotary door having a circumferential wall of which surface is an arcuate face and having an air opening on said arcuate surface and rotatably disposed in said air duct in a position to face said air passage; and a film-shaped block member integrally formed on an outer face of said circumferential wall of said rotary door, whereby when said air passage is closed, said block member is expanded toward an outer circumference by pressure caused by the air so that said block member is forced into contact to seal a circumferential edge of said air passage.

7. An air passage switching device as set forth in claim 6, wherein said rotary door and said block member are connected through a connection portion which can be elastically extended and contracted toward said outer circumference.

8. An air passage switching device as set forth in claim 7, further comprising a switching operation means for displacing said rotary door rotatably by a control cable.

9. A vehicular air conditioner for introducing an air into a compartment, comprising:

an air duct leading air into said compartment and having a plurality of air outlets opening to said compartment;

a blower means for generating air flow in said duct;

a heater disposed in said duct and heating the air which passes therethrough;

an air mixing damper controlling an amount of the air passing through said heater so that a heated air and a bypassed air are mixed downstream of said heater; and an air passage switching device for opening/closing said air outlets including:

a film member disposed in said air duct to be opposite to said air outlets and opening/closing said air outlets, said film member having flexibility;

a rotary supporting member supporting said film member, said film member being mounted on said supporting member, whereby when said air opening is closed by said film member, said film member contacts to seal said air outlets by being forced to press a circumferential edge of said air outlets with bending toward an outer circumference by a wind pressure of said air flow.

10. A vehicular air conditioner for introducing an air into a compartment, comprising:

an air duct leading air into said compartment and having a plurality of air outlets opening to said compartment;

a blower means for generating air flow in said duct;

a heater disposed in said duct and heating the air which passes therethrough;

an air mixing damper controlling an amount of the air passing through said heater so that a heated air and a bypassed air are mixed downstream of said heater; and an air passage switching device for opening/closing said air outlets including:

a film member disposed in said air duct to be opposite to said air outlets and opening/closing said air outlets, said film member having flexibility;

a supporting member supporting said film member, wherein said supporting member is a rotary door having a circumferential wall formed into an arcuate shape and rotatably disposed in said air duct in a position to face said air outlets, said film member is mounted on an outer face of said circumferential wall of said rotary door, whereby when said air opening is closed by said film member, said film member contacts to seal said air outlets by being forced to press a circumferential edge of said air outlets with bending toward an outer circumference by a wind pressure of said air flow.

* * * * *